No. 743,563. PATENTED NOV. 10, 1903.
J. A. ROBERTSON.
PHOTOGRAPHIC FILM CAMERA.
APPLICATION FILED APR. 6, 1903.
NO MODEL.

Witnesses,
Robert Everett.
James L. Norris Jr.

Inventor,
John A. Robertson,
By James L. Norris
Atty.

No. 743,563.

Patented November 10, 1903.

UNITED STATES PATENT OFFICE.

JOHN A. ROBERTSON, OF ROCHESTER, NEW YORK, ASSIGNOR TO ROCHESTER OPTICAL & CAMERA CO., OF ROCHESTER, NEW YORK, A CORPORATION OF NEW YORK.

PHOTOGRAPHIC-FILM CAMERA.

SPECIFICATION forming part of Letters Patent No. 743,563, dated November 10, 1903.

Application filed April 6, 1903. Serial No. 151,333. (No model.)

*To all whom it may concern:*

Be it known that I, JOHN A. ROBERTSON, a citizen of the United States, residing at Rochester, in the county of Monroe and State of New York, have invented new and useful Improvements in Photographic-Film Cameras, of which the following is a specification.

My invention relates to improvements in photographic-film cameras, and has for its object the provision of a novel construction of a camera adapted to contain and permit of the manipulation of a series of sensitized flat-form films contained in a daylight-loading package.

To this end my invention consists in the novel construction of camera hereinafter described and claimed, reference being had to the accompanying drawings illustrating a camera embodying my invention, and in which—

Figure 1:
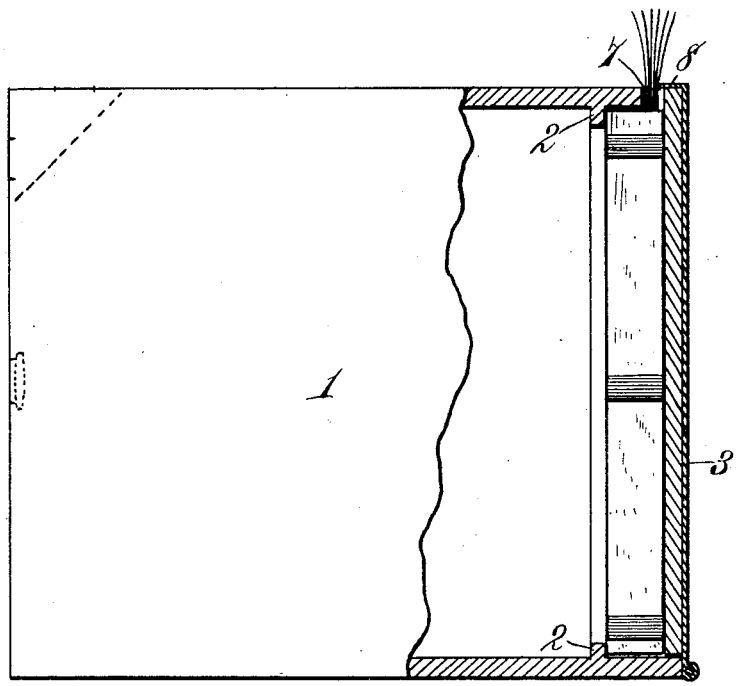
Figure 2:
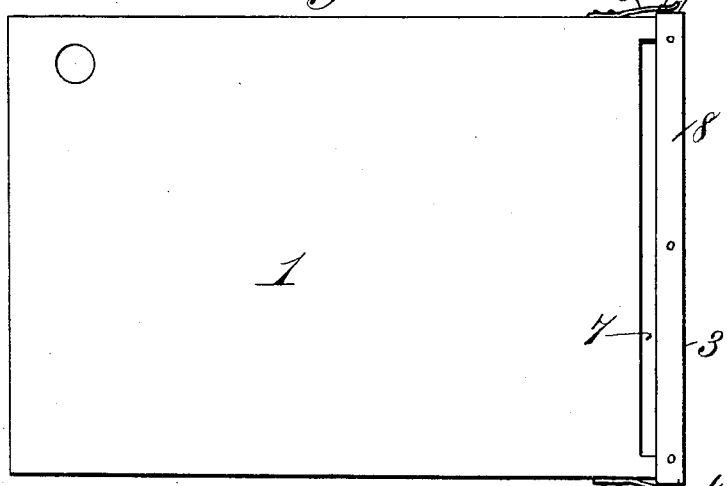

Figure 1 is a longitudinal sectional view of the camera embodying my invention and showing a package of flat films contained therein; and Fig. 2 is a top plan view, the package of films being omitted.

Heretofore what are known as "daylight-loading cameras" have been of the type in which a continuous sensitized film is arranged upon a spool, unwound therefrom and onto another spool, as well known in the art. The need of a camera adapted to expose flat films or sheets of sensitized material instead of the common glass plates or the continuous-roll form of film is recognized for various reasons, and prior to this invention the only type of camera adapted for use in connection with flat-form sensitized films or sheets has been of a character where the film is in flat form, wherein what is known as an "adapter" is fitted to the rear open end of the camera-box.

By my invention I provide a camera adapted to receive and permit of the manipulation of a series of daylight-loading flat sensitized films without the necessity of utilizing the so-called "adapter."

Referring to the accompanying drawings, the reference-numeral 1 indicates the body or box of a camera which may be of ordinary usual or suitable construction, except as otherwise herein indicated. In the rear and near the rear end of this camera body or box is a seat 2 for a package of sensitized films or sheets. This seat preferably and as shown consists of an abutment conforming to the shape of the interior walls of the camera body or box and suitably secured therein.

The numeral 3 designates a movable cover or back for the camera-box to permit the introduction of the daylight-loading package of films. In the example of my invention illustrated herein preferably, though not necessarily, the cover is hinged to the camera-box and is also provided with side flanges 4, adapted when the cover is closed to embrace or lap over the rear side edges of the camera-box for the purpose of excluding light from the interior thereof. When the cover is a hinged one, it is provided with members of a suitable securing means, whereby it is held in closed position, a satisfactory means being that shown in the drawings and consisting of pins or projections 5 on the cover and spring-clasps 6, arranged on the camera-box, to engage therewith. I do not, of course, limit myself to the character of the cover or the securing means therefor, except in respect of those clauses of claim which specify the characteristics of said cover or securing means and then only for the purposes of said particular claim clauses.

The side of the camera opposite that to which the cover is hinged is cut away at the rear to provide a passage 7 from the chamber 9, hereinafter referred to, to the exterior of the camera, through which project the film-manipulating tabs or other devices to facilitate the manipulation thereof by the operator, and to the cover is secured a laterally-projecting strip 8, preferably of metal, the edge of which constitutes one wall of the passage 7 and serves as a tearing edge against which the backing-strip with which the several sensitized films or sheets are provided, if the flat-form film-package be of the character (as it preferably is) of that shown in the allowed application for Letters Patent of myself and Charles E. Hutchings, filed October 18, 1902, Serial No. 127,802, may be torn. There is thus provided within the camera-box and at the rear thereof a chamber 9 for the series of flat-form films which may be introduced thereinto at the rear end of the camera-box when the cover is opened.

In operation a package of films, for instance, and preferably of the character set forth in the application for Letters Patent of myself and Charles E. Hutchings, above referred to, is inserted in the chamber 9 at the rear end of the camera-box, and the cover is closed and as, for example, in the manner illustrated in Fig. 1 of the drawings, in which the package of films is shown in a rather conventional manner. The operator then successively exposes the films by drawing upon the film-manipulating tabs, and when the package of films is of the character disclosed in said application Serial No. 127,802 tears off the withdrawn portion of the film-backing sheets against the tearing edge of the strip 8.

This invention provides a novel and simple construction of camera for receiving and permitting the manipulation of a series of flat sensitized daylight-loading films or sheets in a simple and satisfactory manner and avoids the necessity of the utilization of the heretofore necessary so-called "adapter."

I have shown the camera herein as of the closed-box type. It will, however, be understood, and I so intend it, that the particular type of camera-box is immaterial, and the invention herein described and claimed will be employed in the bellows, extensible, and other type of cameras.

Having thus described my invention, what I claim is—

1. A photographic camera comprising a body having a chamber in its rear end for receiving a series of daylight-loading films, said chamber being provided with an exposure-opening and an opening for the introduction of the films, and with a passage through a wall of the camera-body from the said chamber to the exterior of the camera to receive film-manipulating devices, and a cover for the opening through which the films are introduced, substantially as described.

2. A photographic camera comprising a body having a chamber in its rear end, said chamber being provided with an exposure-opening and an opening for the introduction of a daylight-loading film-package, and with a passage for film-manipulating devices, and a hinged cover for the opening through which the package is introduced, said cover being provided with edge flanges arranged to protect the edges of the package from light, substantially as described.

3. A photographic camera comprising a body having a chamber in its rear end for receiving a package of daylight-loading films, said chamber being provided with an exposure-opening, and an opening for the introduction of the film-package, and with a passage for film-manipulating devices, a hinged cover for the opening through which the package is introduced, said cover being provided with edge flanges arranged to protect the edges of the package from light, and catches for holding the cover closed, substantially as described.

4. A photographic camera comprising a body having a chamber in its rear end for receiving a package of daylight-loading films, said chamber being provided with an exposure-opening and an opening for the introduction of the film-package, and with a passage for film-manipulating devices, and a cover for the opening through which the package is introduced, said cover being provided with a tearing edge, substantially as described.

5. A photographic camera comprising a body portion, having a chamber in its rear end for receiving a package of daylight-loading films, said chamber being provided with an exposure-opening and an opening for the introduction of the film-package, and with a passage for film-manipulating devices and a cover for the opening through which the package is introduced, said cover being provided with a tearing edge consisting of a flange projecting partially across the passage for film-manipulating devices, substantially as described.

6. A photographic camera comprising a body having a chamber in its rear end for receiving a package of daylight-loading films, and a seat for the package of films, said chamber being provided with an exposure-opening and an opening for the introduction of the film-package, and with a passage through a wall of the camera-body from the said chamber to the exterior of the camera to receive film-manipulating devices, and a cover for the opening through which the package is introduced, substantially as described.

In testimony whereof I have hereunto set my hand in presence of two subscribing witnesses.

JOHN A. ROBERTSON.

Witnesses:
A. CARL FISHER,
B. L. DENNY.